March 3, 1931.                G. C. CHASE                1,794,514
                DRIVING MECHANISM FOR CALCULATING MACHINES
                    Filed April 6, 1929      5 Sheets-Sheet 1

George C. Chase  INVENTOR

BY  W. A. Sparks his  ATTORNEY

George C. Chase
INVENTOR

BY H. A. Sparks
his ATTORNEY

March 3, 1931.  G. C. CHASE  1,794,514
DRIVING MECHANISM FOR CALCULATING MACHINES
Filed April 6, 1929  5 Sheets-Sheet 5

George C. Chase INVENTOR.
BY H. A. Sparks
his ATTORNEY.

Patented Mar. 3, 1931

1,794,514

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

DRIVING MECHANISM FOR CALCULATING MACHINES

Application filed April 6, 1929. Serial No. 353,107.

This invention relates to an entocyclic gear transmission for calculating and similar machines; and one of the principal objects is to produce an entocyclic gear transmission whereby a driven shaft may be rotated in either direction at the will of the operator, which is obviously useful in machines performing the opposite operations of addition and subtraction or the correlative operations of multiplication and division.

Another object is to provide a transmission which shall be very compact, simple in construction and consisting of few parts which parts are of such form that they may readily be manufactured of punched sheet metal, certain of the parts being adapted for manufacture by the process set forth in my application Serial No. 343,490, filed Feb. 28, 1929, to which reference may be had.

Another object of the invention is to provide a transmission mechanism which will be quieter in its operation and in which the parts may be made lighter in weight because of the greater inherent strength of the gear tooth arrangement.

Another object of the invention is to provide a new and improved entocyclic gear device to transmit the power smoothly and without vibration from an eccentric driving element to a concentric driven element.

Another object is to provide compound entocyclic gearing for transmitting power for driving a calculating mechanism in either direction and coupling the driving and driven elements so as to give uniform driving movement with simplicity of construction, light weight, a rotary rather than a to-and-fro movement, and a range of gear ratios.

Other objects will be apparent from the following detailed description, and will be particularly pointed out in the appended claims. I attain all of these objects by means shown in the accompanying drawings, in which:

Like characters of reference refer to like parts in all views.

Figure 1:
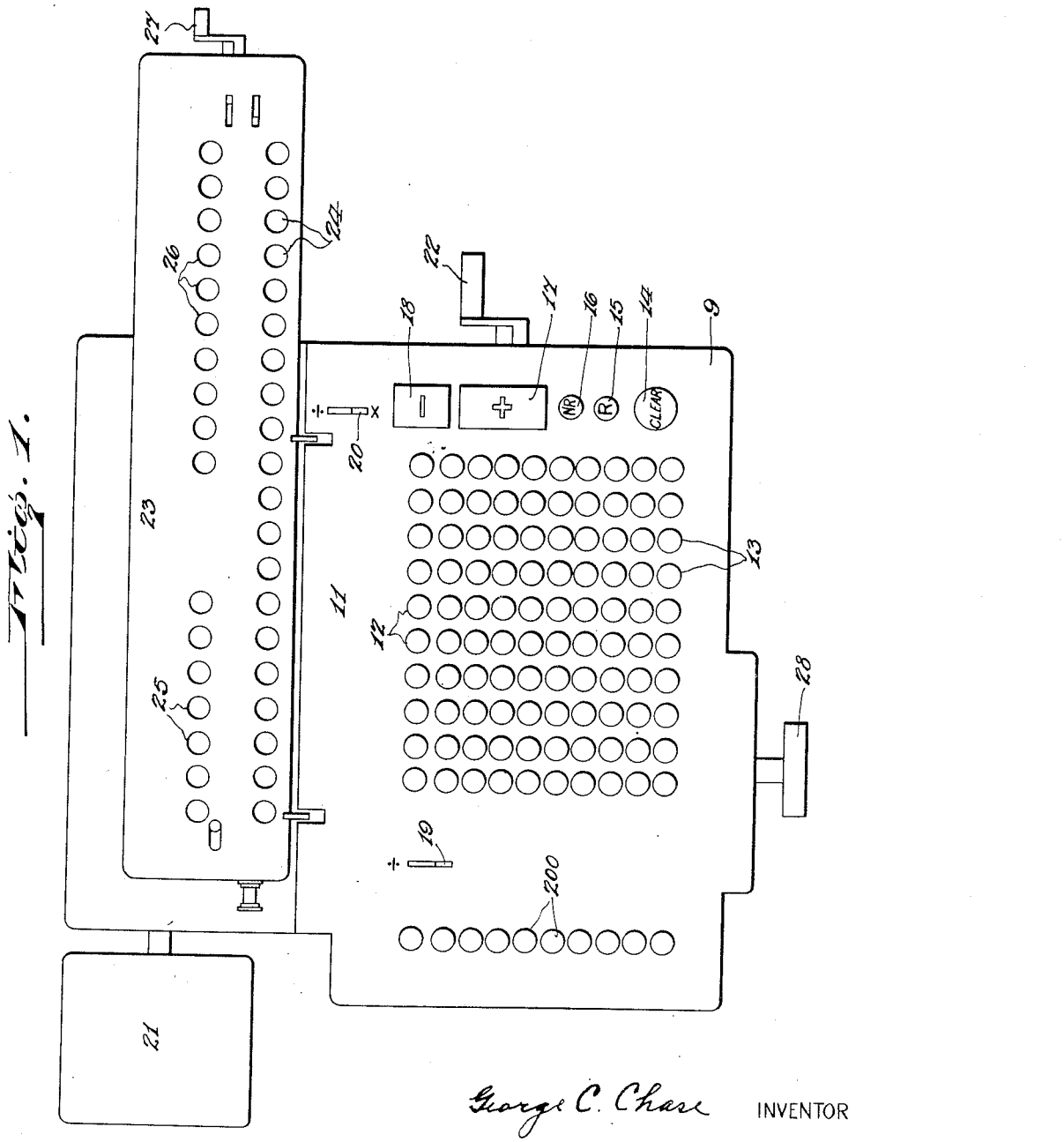
Fig. 1 is a top plan view of a machine in which my invention is incorporated.

In United States Patent No. 1,566,650, granted to me on December 22, 1925, and entitled "Operating means for calculators," I have shown and described a planetary transmission for use in connection with reversible computing mechanism, the specific mechanism with which it is shown being the well-known Monroe calculating mechanism. The present invention contemplates the providing of an entocyclic gear transmission in place of said planetary transmission, and in which one of the chief features of novelty is the constructing of a transmission device of this nature so as to be operable from a driving element rotatable in one direction and to effect rotation of a driven element in either direction at will, whereby accumulators may be driven in one direction for effecting addition and multiplication, and in the reverse direction for effecting subtraction and division. In devising this device, a new method of forming internal gears and the like has been developed, which method has been described in my pending application Ser. No. 343,490, filed Feb. 28, 1929.

The term "entocyclic gearing" as herein used is meant to differentiate the form of eccentric gearing shown and described, from planetary gearing. This term is herein used in the sense in which the term "annular gearing" has been used by P. H. Bryant in an article published in "American Machinist," Vol. 60, No. 4, at pages 125–128. However, the term "annular" as applied to gears has attained a definite meaning in the mechanical arts, namely, internal gears regardless of whether mounted concentric with or eccentric to other gears. In other words "annular" refers rather to a particular form of gear and not to any specific manner of entraining gears, so that "annular" is used in the same sort of way as "spur" or "crown" in referring to gears, rather than in a sense comparably to "planetary." Therefore, inasmuch as the mechanical arts appear to lack a descriptive name for what Mr. Bryant termed "annular gearing," it has seemed advisable to coin a term for use in this application, and this term is "entocyclic."

Planetary gears are known as "epicyclic", "epi" meaning "upon, beside, over" which describes the planet gear in relation to the sun gear. The word "epicycloid" is defined as "a curve traced by a point on the circumference of a circle which rolls upon the convex circumference of another circle," which describes the planetary gear rolling around the sun gear. "Entocycloid" suggests a circle rolling around within the circumference of a larger circle. While it is realized that the planet and ring gears of a planetary train have this entocyclic action, the epicyclic action is always present with the planetary system and is not present in what is herein termed an entocyclic system.

Carrying the definition of terms a step further, it is to be noted that the entocyclic gearing of the prior art as set forth in Mr. Bryant's article, may be termed "simple entocyclic gearing," consisting of one pair of gears eccentrically mounted with relation to each other, and with an eccentric relation between the driving element and the driven element which requires a coupling device of some kind to establish a concentric relation between driving and driven elements so as to procure uniform speed of the driven element. Such a coupling has been known in the prior art, as for instance in the Oldham coupling; but in the present invention the entocyclic gearing has been compounded so that in a train of gearing there are two sets of gears having neutralizing eccentricities so that the driving axis and the driven axis coincide. To this train of entocyclic gearing, the term "compound entocyclic gearing" will be applied to distinguish from simple entocyclic gearing with Oldham or modified Oldham coupling.

As set forth in Mr. Bryant's article, in planetary gearing, one of the gears rolls about another, whereas in entocyclic gearing the teeth act more in the nature of wedges. As to whether "entocyclic gearing" is gearing at all in the true sense of the term, is a moot question, but it is to be understood that the term "entocyclic gearing" and any derivative expression as used herein is intended to refer to a train of elements in which the teeth of certain elements have the wedging action mentioned, as distinguished from ordinary gearing and from planetary gearing. A characteristic of "entocyclic gearing" as distinguished from planetary gearing is the diminishing of the number of parts in an operative train. Thus in its simplest form, a planetary gearing train comprises (1) sun gear, (2) eccentric arm, (3) planet gear, and (4) internal gear; whereas in the simplest and consequently corresponding entocyclic gearing train there are (1) eccentric arm (2) eccentric gear (3) internal gear. Thus we have four parts in a plentary gearing and only three in the corresponding entocyclic gearing, the sun gear being eliminated in the entocyclic system.

Figure 6:
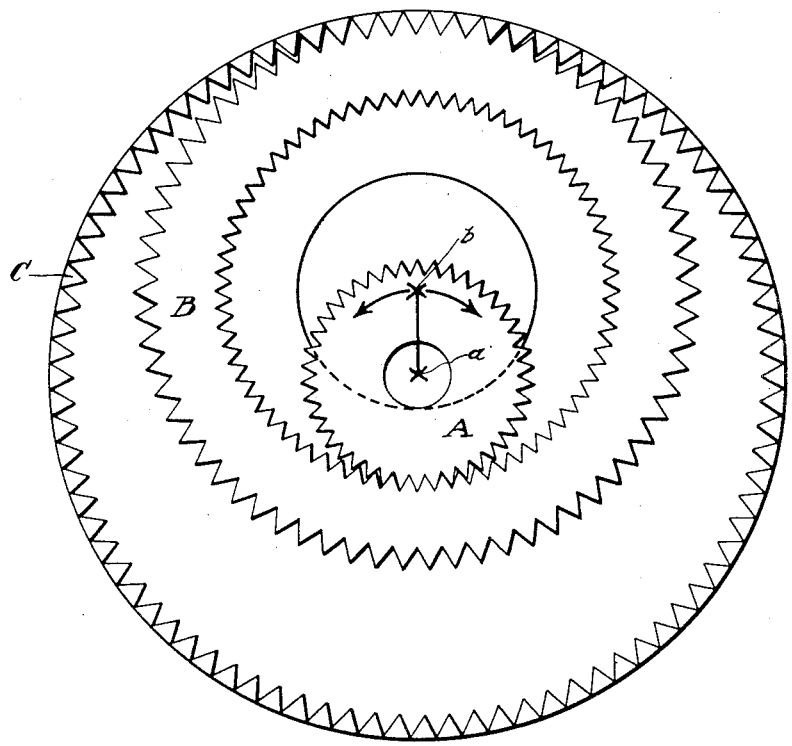
Fig. 6 is a diagrammatic view illustrating the principles of entocylic gearing.

The diagrammatic showing of Fig. 6 has been made to illustrate as simply as possible the principle of compound entocyclic gearing. In this drawing is shown a spur gear A mounted for rotation about an axis $a$, and meshing the internal teeth of a gear B mounted for rotation about axis $b$ the axis $b$ is eccentric to axis $a$ and rotatable therearound with it its gear B. Gear B is formed with exterior teeth which constantly mesh the teeth of an annular or internal gear C having its axis coincident with the axis $a$. Eccentric $a$—$b$, gear A, and internal gear B, taken apart from external teeth B and internal gear C comprise a simple entocyclic train, the driven element of which both rotates and moves eccentrically. Owing to this eccentric movement, an Oldham coupling or its equivalent is required to take off the motion at a constant speed ratio. If, however, we consider the exterior teeth of B and the gear C as a second entocyclic couple substituted for the Oldham coupling, then we have a compound entocyclic train, having all the advantages hereinbefore and hereinafter pointed out. With this general idea of compound entocyclic gearing, the specific embodiment shown in the drawings will now be described after which the system will be more fully analyzed.

Referring now to the drawings in detail, 9 represents the casing and 10 the framework of a calculating machine. By way of illustrating the application of my invention, I have chosen to show the same as incorporated in a calculating machine of the well-known Monroe construction, although this is to be considered as merely illustrative, the invention being applicable to machines of various types.

The keyboard frame is shown at 11 and guides a plurality of manipulative members as follows: digit setting keys 12, zero keys 13, keyboard clearing key 14, repeat key 15, non-repeat key 16, add operating key or plus bar 17, subtract operating key or minus bar 18, division lever 19, counter rotation-reversing shift lever 20, and multiplying keys 200. A driving motor is shown at 21, a hand operating crank at 22, and a carriage at 23. The carriage 23 carries a plurality of accumulators 24, and two sets of counters indicated at 25 and 26, the counters 25 being of the "nineteen-point" type (having no carrying mechanism and each bearing the nine significant digits running in reverse directions from a common zero, one set of significant digits being colored differently from the other), and the counters 26 being of the usual "ten-point" type with carry mechanism.

Figure 2:
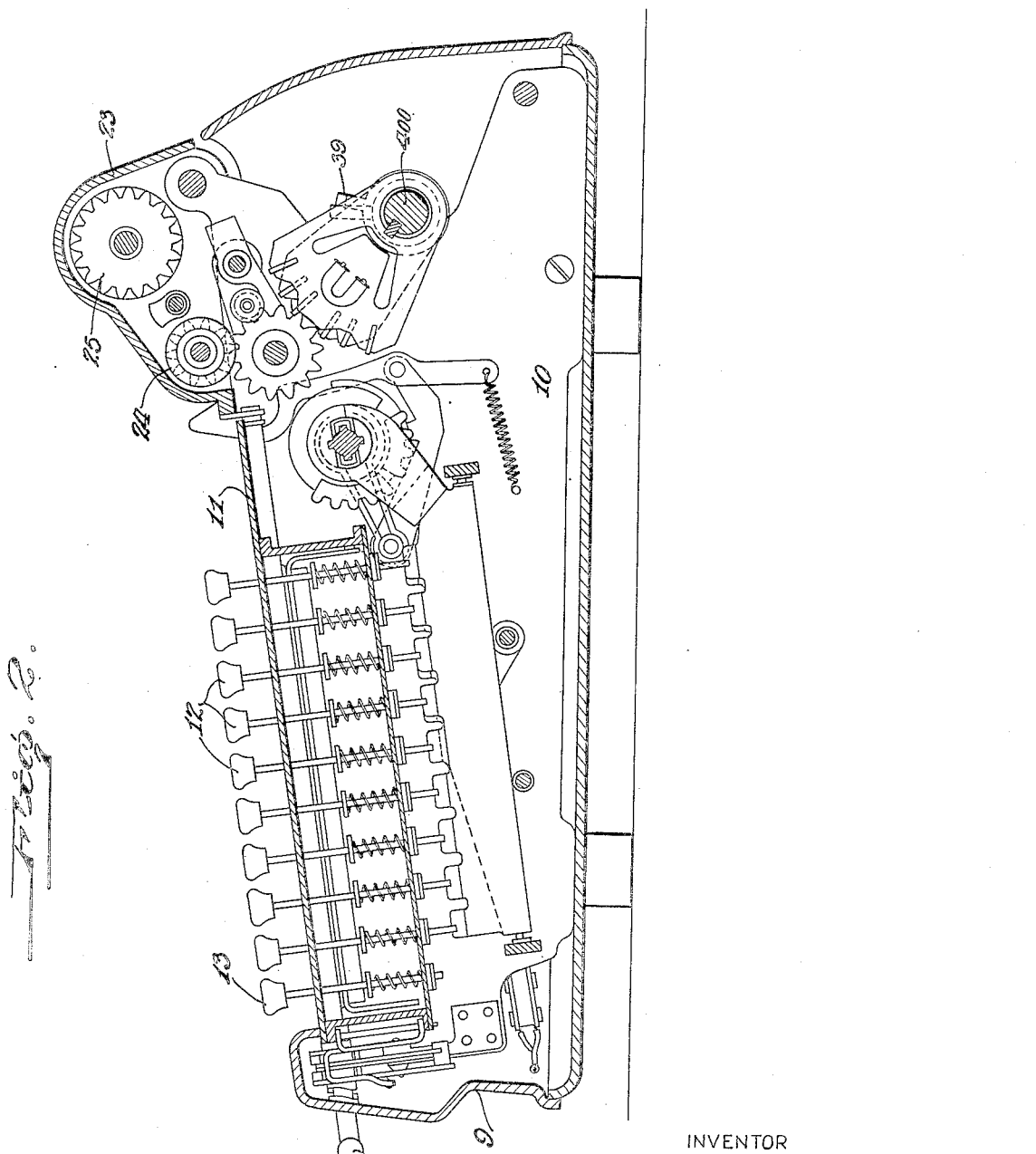
Fig. 2 is a front-to-rear section of the machine showing the general actuating mechanism.

The direction of rotation of the accumulators and counters 24, 25, and 26 is controlled by the manipulative members 17, 18, 19 and 20, the latter serving merely to reverse driving of the counters 26 and not of the actuators; and clearing of the accumulators and counters may be effected by crank 27. The carriage may be moved for shifting the accumulators and counters with relation to the keyboard by manipulating a member indicated at 28. The actuating devices are shown in Fig. 2, but these have been fully shown and described in U. S. Application No. 337,073 of E. F. Britten, Jr. filed February 2, 1929 and entitled "Registering mechanism" to which, as well as other disclosures therein referred to, reference may be had for a complete disclosure.

Figure 4:
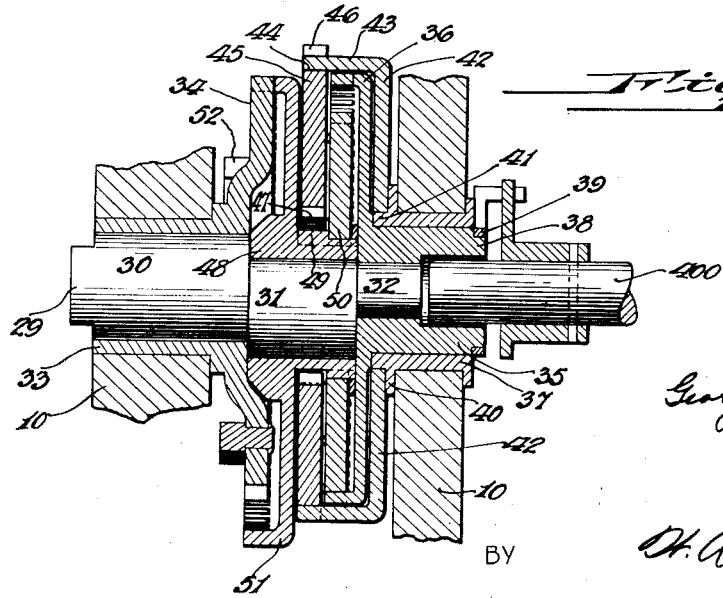
Fig. 4 is a vertical sectional view of the driving shaft and the present invention per se.
Figure 5:
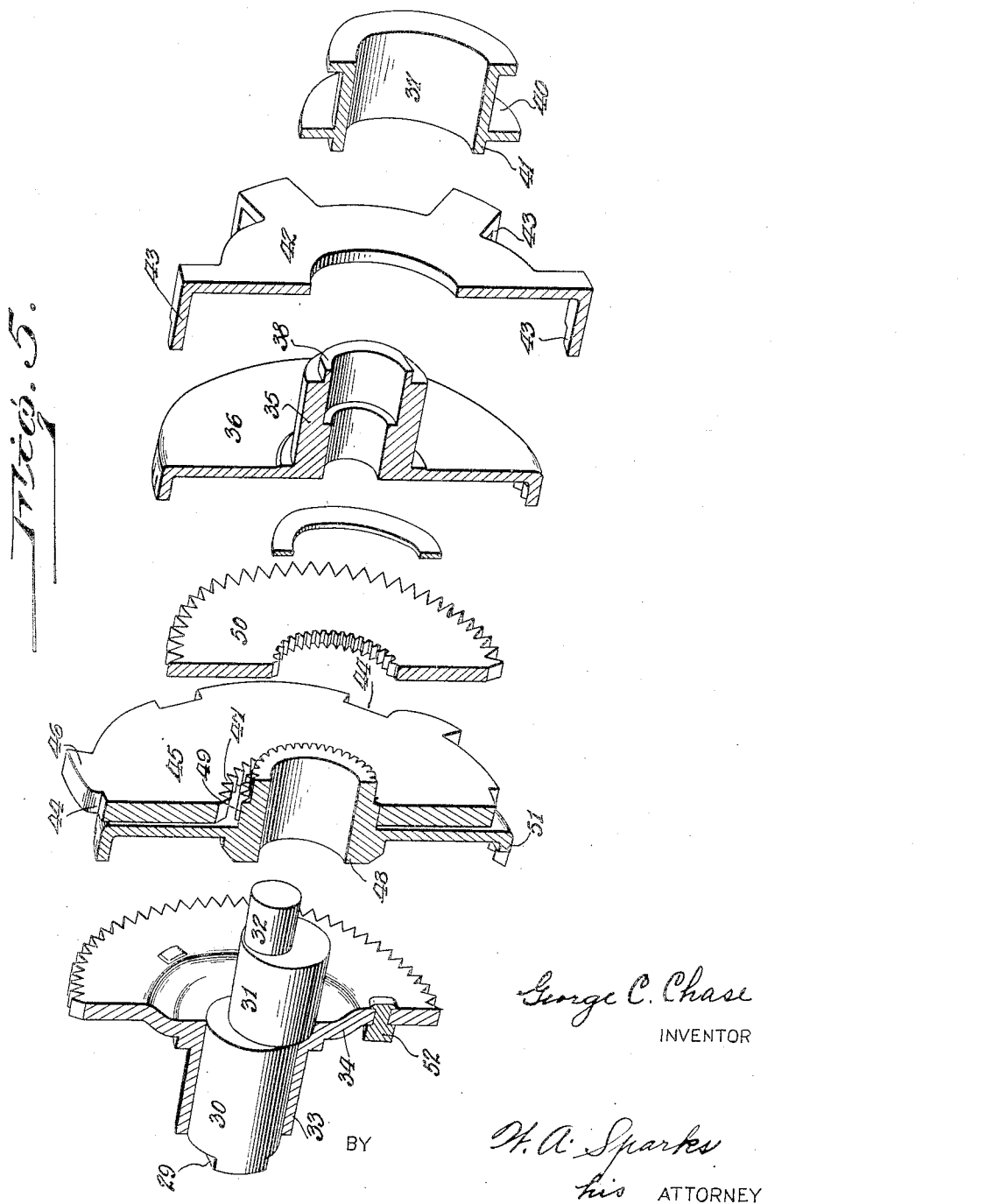
Fig. 5 is a sectional, exploded, perspective view of the same.

The motor 21 may be connected with a drive shaft as at 29. This shaft as seen in Figs. 4 and 5 consists of three sections 30, 31 and 32 formed as a single piece, all three being cylindrical, sections 30 and 32 being concentric or coaxial while the intermediate section 31 is eccentrically disposed with relation to the end sections. The section 30 is rotatably mounted in a bearing formed by the sleeve-like hub portion 33 of a gear wheel 34, the sleeve 33 itself being rotatably mounted in a bearing formed in one of the main frame members 10. The section 32 is mounted for rotation in a bearing formed in the hub 35 of an internal gear 36, the hub 35 is rotatably mounted in a sleeve 37 secured against axial displacement in another of the frame members 10. The end of the hub or sleeve 35 is formed at 38 for connection to a take-off member 39 whereby the power is transmitted to the shaft 400 for driving the actuating mechanism of the machine.

The sleeve 37 is provided with a collar 40 for contact with the supporting frame member 10 and is extended toward the left (as seen in Fig. 4), as indicated at 41, to form a bearing for a member 42 which has peripheral fingers 43 extending toward the left and having their reduced ends extended into peripheral notches 44 in a disc 45 so as to hold members 42 and 45 for rotation as a single element and to maintain disc 45 in coaxial relation with elements 30 and 32. The disc 45 is formed with stop shoulders 46 and the center is pierced and formed with internal gear teeth 47.

Rotatably mounted on the eccentric shaft-portion 31 is a sleeve 48 having gear teeth 49, and carrying a gear wheel 50 at one end and an internal gear 51 at the other end. The members 48, 50 and 51 may be secured together in any well known desirable manner so as to move with each other as a single element. In Fig. 5 the aperture in gear 50 and the cooperating portion of sleeve 48 are shown as serrated. This is merely for connecting the two members, the serrations not being gear teeth but mere engaging elements to secure the gear against movement on the sleeve. The teeth 49 mesh with the internal teeth 47 of member 45; the teeth of gear 50 mesh the internal teeth of member 36; and the internal teeth of member 51 mesh with the teeth of gear 34, so that the device includes three pairs of entocyclic gears, which make up two complete trains of compond entocylic gears. Gear 50 and member 36 are common to both compound entocyclic trains. The adding train comprises gears 34, 51, 50 and 36, whereas the subtracting train comprises gears 49, 47, 50 and 36.

Figure 3:
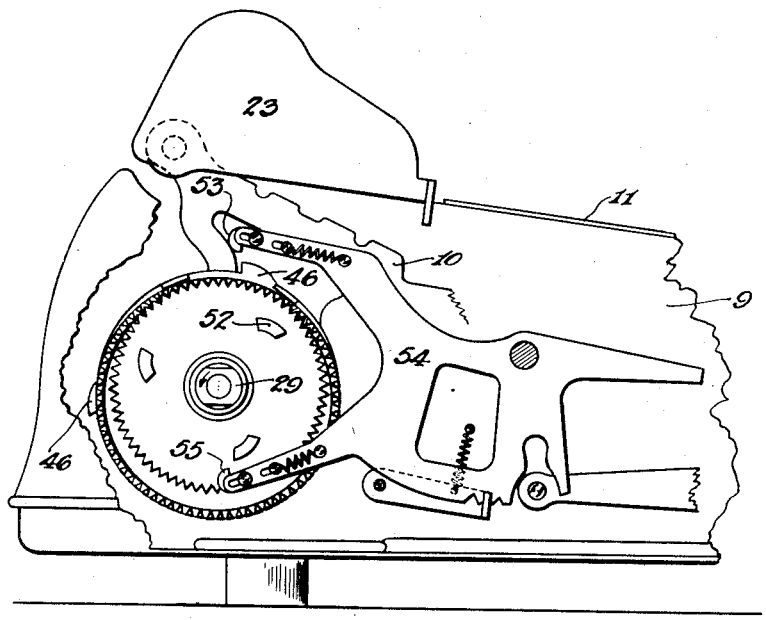
Fig. 3 is a fragmentary vertical sectional view showing my present invention in place.

Gear 34 carries lateral stop shoulders 52. Referring now to Fig. 3 it will be seen that stop shoulders 46 are adapted to be engaged by a clutch pawl 53 mounted on one arm of a two-armed reversing clutch lever 54, while stops 52 are adapted to be engaged by a clutch pawl 55 mounted on the other arm of said lever. Lever 54 is shown in its neutral position from which it may be moved by manipulation of keys to bring either the clutch pawl 53 into the path of stops 46, or the clutch pawl 55 into the path of stops 52.

From the above description of parts, it will be seen that I have produced a compound entocyclic transmission in which all of the gears are adapted to be manufactured of punched sheet metal, the internal gears of which may be readily manufactured according to the process set forth in my said application Serial No. 343,490.

*Operation*

When the reversing clutch lever 54 is in the intermediate position shown in Fig. 3 the driving shaft 30, 31, 32 should run idly. In this case the load of the actuating mechanism holds the take-off member 39 stationary which holds sleeve 35 and gear 36 against rotation. The rotation of the driving shaft counter-clockwise (as seen in Fig. 3) causes the gear 50 to walk around the inside of internal gear 36, whereby the gear 50, sleeve 48 and internal gear 51 are rotated clockwise about their axle 31. This rotation of the sleeve 48 causes counter-clockwise rotation of the disc or gear 45 owing to the coaction of teeth 47 and 49; and at the same time the clockwise rotation of internal gear 51 effects clockwise rotation of gear 34. Thus during idling operation of the driving shaft and associated entocylic gearing, the stops 46 travel counter-clockwise and the stops 52 travel clockwise.

When reversing clutch lever 54 is moved for effecting subtraction or division clutch pawl 53 is depressed into the path of stop shoulders 46 and when one of said stop shoulders is engaged and detained by the pawl 53, the disc 45 is held against rotation and teeth 49 walk around the now stationary teeth 47. This causes members 48, 50 and 51 to turn clockwise about their axle 31, and gear 50 turns gear 36, sleeve 35 and the connected take-off member clockwise. Incidentally gear 51 continues to turn gear 34 clockwise but this may be disregarded in this connection as it is merely incidental.

Considering that reversing clutch lever 54 is again in neutral position and the shaft and entocyclic gearing are idling, if lever 54 is rocked so as to bring the clutch pawl 55 into the path of movement of stops 52 for effecting addition or multiplication, the pawl 55 will intercept one of the stops 52 and hold gear 34 against movement. This causes the meshed gear to rotate counter-clockwise carrying with it sleeve 48 and gear 50, the latter effecting counter-clockwise rotation of internal gear 36 with its sleeve 35 and take-off member 39. Incidentally, and in this connection only incidentally, the teeth 49 coact with teeth 47 to effect counter-clockwise rotation of disc 45.

Thus it will be seen that the rotation of the driving shaft in a single direction will cause rotation in opposite directions of the stop-carriers 45 and 34 when both are free to rotate; rotation of sleeve 35 and its connections in one direction when member 45 is held against rotation; and rotation of sleeve 35 and its connections in the reverse direction when member 34 is held against rotation, all of these movements being caused by the coaction of the elements of the entocyclic gearing.

It will be noted that the entocyclic gear pair 50, 36 serve merely to transmit the motion from the balance of the annular gearing. This gear pair serves as a coupling member between the other entocylic gearing and the driven mechanism and translates an otherwise variable speed into a constant speed and avoids the disadvantages of a coupling of the Oldham type. The Oldham coupling also provides for constant speed, but it is objectionable on account of: (1) its complication; (2) the fact that it is limited to a 1–1 gear ratio between its elements corresponding to elements 50 and 36 of the present construction; (3) its to-and-fro motion which sets up considerable vibration when operated at high speeds; (4) its weight. When, as herein shown and described, the pair 50—36 are entocyclic: (1) the construction is simpler than the Oldham construction; (2) the speed range of a transmission is greatly increased because various gear ratios may be established between the entocyclic pair 50—36, and the gear ratios of this pair may be positive or negative in sign, i. e. the entocyclic pair may have a greater or less ratio than 1–1, inasmuch as element 50 may obviously be an internal gear rolling around element 36 which may be a spur gear; (3) the movement is circular instead of vibratory; and (4) the weight of the parts is so reduced that vibration resulting from eccentric weights is much less than the vibration with an Oldham coupling, and in heavy structures the eccentric weight of an entocyclic gear could probably be balanced out either by counter weights or by arranging two pairs of gears on opposite sides of the center. It will, therefore, be seen that even if the entocyclic gearing were constructed merely to give a one-way drive to the driven member, the use of this additional entocyclic gear coupling pair would be desirable, and hence the invention in this particular is not limited to reversible drives. That is, the invention is applicable to three-element entocyclic transmission as well as four-element as will now be explained.

A three-element transmission would be one in which there is a driving element, a driven element, and a control element. ("Element" is here used not in the sense of a part or piece but of the means necessary for a particular function the term being used in the same sense as the word "legs" when speaking of the "legs of a differential.") In a three-element transmission, there are three functions, (1) driving, (2) receiving, and (3) controlling, and any one of the three elements of the transmission may take on any one of these functions.

The present disclosure is of a four-element entocyclic transmission wherein there are (1) a driver, (2) a receiver, and (3 and 4) two controls. Now the peculiarity of this particular type of four-element transmission is that each of the control elements partakes of the nature of a receiving element, and when one of them is functioning as a control, the other must always be free to be driven or receive, and could be connected at such times as a secondary driven element. Thus during idling operation, the controls are both receiving elements, the normal receiver acting as a control, by virtue of the load on it, to effect driving of the normal controls in reverse direction; and when either normal control is caused to effect controlling, the other control and the normal receiver are driven. The normal receiver is driven in one direction under the control of one normal control and in the opposite direction under the control of the other normal control element. I have used the term "normal" here to point out the elements to which certain functions have been allotted in this specific embodiment; but it is to be understood that broadly, the invention contemplates a four-element entocyclic transmission any one or two of which elements may be driver, receiver, or control, it being a mere matter of proportions and design to make this possible and practical.

The practical advantages of this form of transmission are many and important. For instance, such a transmission can be designed to cover a greater range of gear reduction than ordinary planetary gearing. Furthermore the device is particularly adaptable for use with either motor or hand-driven calculating machines of the Monroe or other reversible type, or even to a one-way machine (Thomas type). Also it could be utilized to advantage in driving a battery of machines of either type or including machines of both the reversible and one-way types.

Hence, while I have described what I consider to be the most desirable embodiment of my invention for the purpose set forth, it is obvious that changes in form could be made without departing from the spirit of my invention, and I, therefore, do not limit myself to the exact details herein shown and described, or to anything less than the whole of my invention as hereinafter particularly pointed out in the claims.

I claim:

1. In a device of the class described, the combination of a driving shaft, a driven shaft, a plurality of entocyclic gears interposed between said shafts and including an internal gear provided with an external holding element, and a supporting member arranged at one side of said gears and formed with elements extending to said internal gear for supporting the same.

2. In a device of the class described, the combination of a driving shaft, a driven shaft, a plurality of entocyclic gears interposed between said shafts and including an internal gear provided with an external holding element, and a supporting member arranged at one side of said gears and formed with elements extending over certain of said gears and into engagement with said internal gear for supporting the same.

3. In a device of the class described, the combinaiton of a driving shaft; a driven shaft; three pairs of entocyclic gears interposed between said shafts, one of said pairs including a gear provided with a holding lug, and the second of said pairs including an internal gear formed with peripheral holding means; and a supporting member arranged at one side of said gears and formed with elements extending across one pair of said gears for supporting said internal gear.

4. In a device of the class described, the combination of a driving shaft; a driven shaft; three pairs of entocyclic gears interposed between said shafts, one of said pairs including a gear provided with a holding lug, and the second of said pairs including an internal gear formed with peripheral holding means; a supporting member arranged at one side of said gears and formed with elements extending across one pair of said gears for supporting said internal gear; and a lever provided with holding elements cooperative respectively with said lug and said peripheral holding means whereby said driving shaft may be caused to drive said driven shaft in either direction at the will of the operator.

In testimony whereof I affix my signature.

GEORGE C. CHASE.